(12) United States Patent
Kanazawa

(10) Patent No.: US 10,998,570 B2
(45) Date of Patent: May 4, 2021

(54) FUEL CELL VEHICLE

(71) Applicant: HONDA MOTOR CO., LTD., Tokyo (JP)

(72) Inventor: Takuma Kanazawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 16/434,189

(22) Filed: Jun. 7, 2019

(65) Prior Publication Data
US 2019/0386329 A1 Dec. 19, 2019

(30) Foreign Application Priority Data

Jun. 13, 2018 (JP) .............................. JP2018-112460

(51) Int. Cl.
| | |
|---|---|
| *H01M 8/2475* | (2016.01) |
| *H01M 8/0432* | (2016.01) |
| *B60K 1/04* | (2019.01) |
| *H01M 8/0438* | (2016.01) |
| *H01M 8/04014* | (2016.01) |
| *H01M 8/04007* | (2016.01) |
| *B60K 13/02* | (2006.01) |
| *H01M 8/04746* | (2016.01) |

(52) U.S. Cl.
CPC ............ *H01M 8/2475* (2013.01); *B60K 1/04* (2013.01); *B60K 13/02* (2013.01); *H01M 8/04014* (2013.01); *H01M 8/0441* (2013.01); *H01M 8/04067* (2013.01); *H01M 8/04358* (2013.01); *H01M 8/04753* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 6,521,366 B1 * | 2/2003 | Lamm | H01M 8/04186 429/437 |
| 2012/0070757 A1 | 3/2012 | Katano | |
| 2015/0270566 A1 * | 9/2015 | Lee | F04D 29/5826 429/455 |
| 2016/0207419 A1 * | 7/2016 | Ohashi | B60L 1/003 |
| 2018/0123148 A1 * | 5/2018 | Itoga | H01M 8/242 |

FOREIGN PATENT DOCUMENTS

JP 2010-269760 12/2010

* cited by examiner

*Primary Examiner* — Daniel S Gatewood
(74) *Attorney, Agent, or Firm* — Amin, Turocy & Watson, LLP

(57) ABSTRACT

A fuel cell vehicle includes a fuel cell system and an exhaust gas pipe. The fuel cell system includes a fuel cell stack, an oxygen-containing gas supply line, an oxygen-containing gas discharge line, and an air pump. The air pump includes a compressor provided in an oxygen-containing gas supply line, and an expander provided in an oxygen-containing gas discharge line. An air cleaner is provided upstream of the compressor. An exhaust gas pipe is connected to an expander. The air compressor is closer to the air cleaner than the expander is.

8 Claims, 4 Drawing Sheets

FUEL CELL VEHICLE

CROSS-REFERENCE TO RELATED APPLICATION

This application is based upon and claims the benefit of priority from Japanese Patent Application No. 2018-112460 filed on Jun. 13, 2018, the contents of which are incorporated herein by reference.

BACKGROUND OF THE INVENTION

Field of the Invention

The present invention relates to a fuel cell vehicle.

Description of the Related Art

For example, Japanese Laid-Open Patent Publication No. 2010-269760 discloses a fuel cell vehicle equipped with a fuel cell stack. An air pump supplies the air as an oxygen-containing gas to the fuel cell stack. An exhaust gas pipe is connected to a cathode outlet of a fuel cell stack, and a cathode exhaust gas containing the air is discharged to the outside of the vehicle through an exhaust gas pipe. Typically, a fuel cell stack is mounted in a front part of the vehicle, and the exhaust gas pipe extends along a floor surface of the vehicle, and extends up to a vehicle rear part. The cathode exhaust gas is discharged from the vehicle rear part to the outside of the vehicle.

SUMMARY OF THE INVENTION

Pipes such as an air exhaust gas pipe connecting an air pump and a fuel cell stack are provided in the vicinity of the air pump. In terms of streamlining the structure, it is desired that the layout of these pipes can be determined efficiently.

In an attempt to address the problem, an object of the present invention is to provide a fuel cell vehicle which makes it possible to improve the layout efficiency of providing pipes in the vicinity of an air pump provided for the fuel cell stack.

In order to achieve the above object, according to an aspect of the present invention, a fuel cell vehicle is provided. The fuel cell vehicle includes a fuel cell system, and an exhaust gas pipe configured to discharge a cathode exhaust gas flowing out from the fuel cell system to the outside of the fuel cell vehicle. The fuel cell system includes a fuel cell stack, an oxygen-containing gas supply line connected to the fuel cell stack, an oxygen-containing gas discharge line connected to the fuel cell stack, an air pump including a compressor provided in the oxygen-containing gas supply line and an expander as a regenerative mechanism provided in the oxygen-containing gas discharge line, and an air cleaner provided upstream of the compressor. The exhaust gas pipe is connected to the expander, and the compressor is closer to the air cleaner than the expander is.

In the fuel cell vehicle of the present invention, since the compressor is closer to the air cleaner than the expander is, it is possible to improve the layout efficiency of the pipe connecting the air cleaner and the compressor. Further, since the expander is provided at a remote position in comparison with the compressor, it is possible to improve the layout efficiency of the exhaust gas pipe. Therefore, in the fuel cell vehicle, it is possible to improve the layout efficiency of providing pipes in the vicinity of the air pump.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
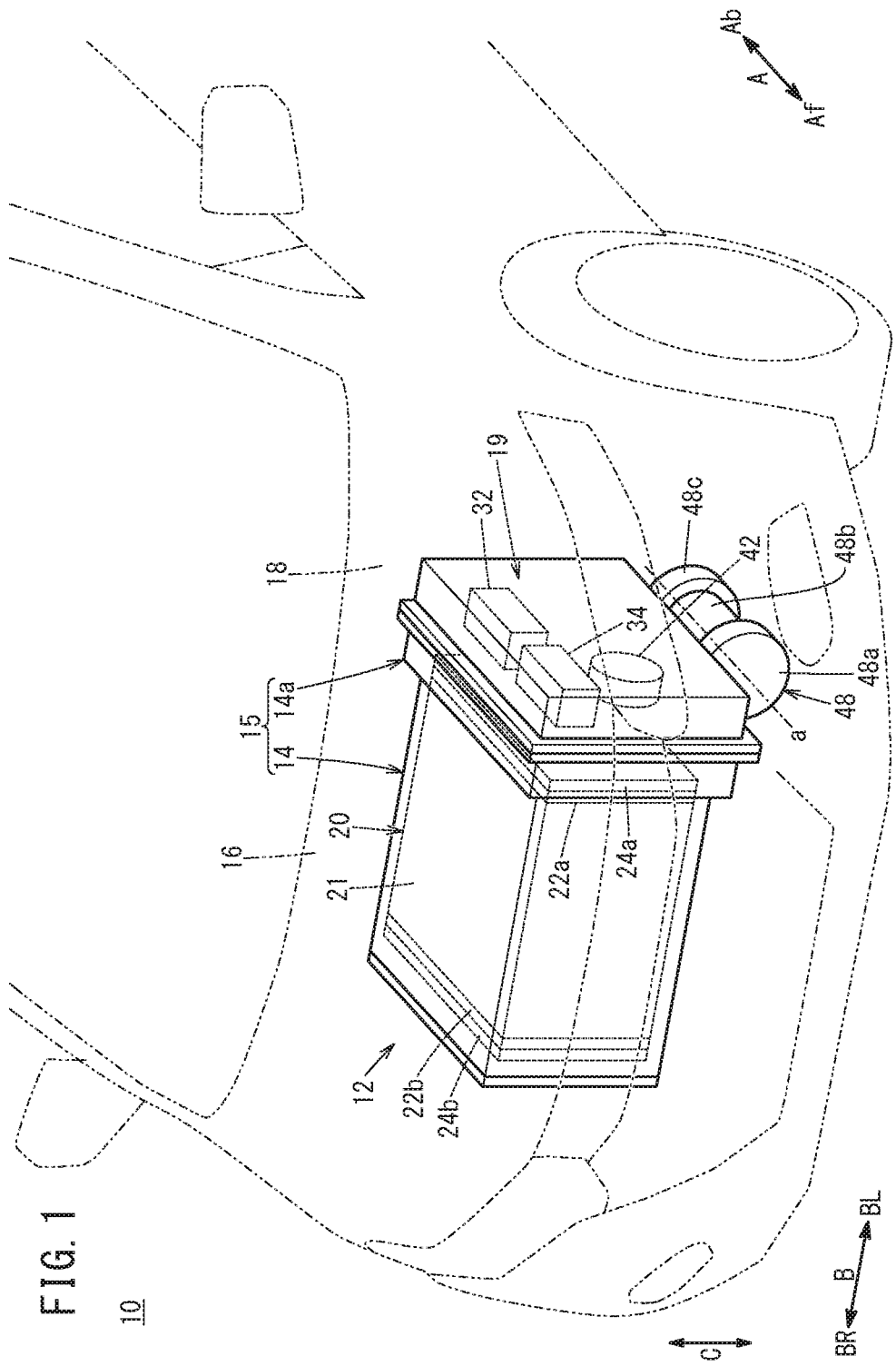
FIG. 1 is a perspective view showing a front portion of a fuel cell vehicle according to an embodiment of the present invention.

As shown in FIG. 1, for example, a fuel cell vehicle 10 including a fuel cell system 12 according to an embodiment of the present invention is a fuel cell electric vehicle. In the following description, the "upper direction (upper part (position))" means the "upper direction (upper part (position))" in the vertical direction, and the "lower direction (lower part (position))" means the "lower direction (lower part (position))" in the vertical direction. In the fuel cell vehicle 10, a stack case 14 containing a fuel cell stack 20 is provided in a front room (motor room) formed on the front side of a dash board 16 (in a direction indicated by an arrow Af).

The fuel cell stack 20 includes a cell stack body 21 formed by stacking a plurality of power generation cells in a vehicle width direction (indicated by an arrow B). A plurality of power generation cells may be stacked in the vertical direction. A first terminal plate 22a is provided at one end of the cell stack body 21 in a stacking direction (indicated by an arrow BL), and a first insulating plate 24a is provided outside the first terminal plate 22a. A second terminal plate 22b is provided at the other end of the cell stack body 21 in the stacking direction (indicated by an arrow BR), and a second insulating plate 24b is provided outside the second terminal plate 22b.

The fuel cell system 12 includes a stack case 14 containing the fuel cell stack 20 and an auxiliary device case 14a containing fuel cell auxiliary devices 19. The stack case 14 and the auxiliary device case 14a form a case unit 15. The case unit 15 made up of the stack case 14 and the auxiliary device case 14a has a rectangular shape (having long sides extending in the vehicle width direction) in a plan view.

The auxiliary device case 14a is a protection case for protecting the fuel cell auxiliary devices 19, and positioned adjacent the stack case 14 in a horizontal direction, and joined to the stack case 14. As the fuel cell auxiliary devices 19, fuel gas system devices and oxygen-containing gas system devices are placed in the auxiliary device case 14a. The fuel gas system devices contained in the auxiliary device case 14a are an injector 32, an ejector 34, a hydrogen pump 42, and various valves (not shown).

It should be noted that a ventilation duct (not shown) is connected to an upper portion of the case unit 15. In the case where the fuel gas is leaked out of the fuel cell stack 20 or the fuel cell auxiliary device 19, the fuel gas is discharged to the outside of the fuel cell vehicle 10 through the ventilation duct.

Figure 2:
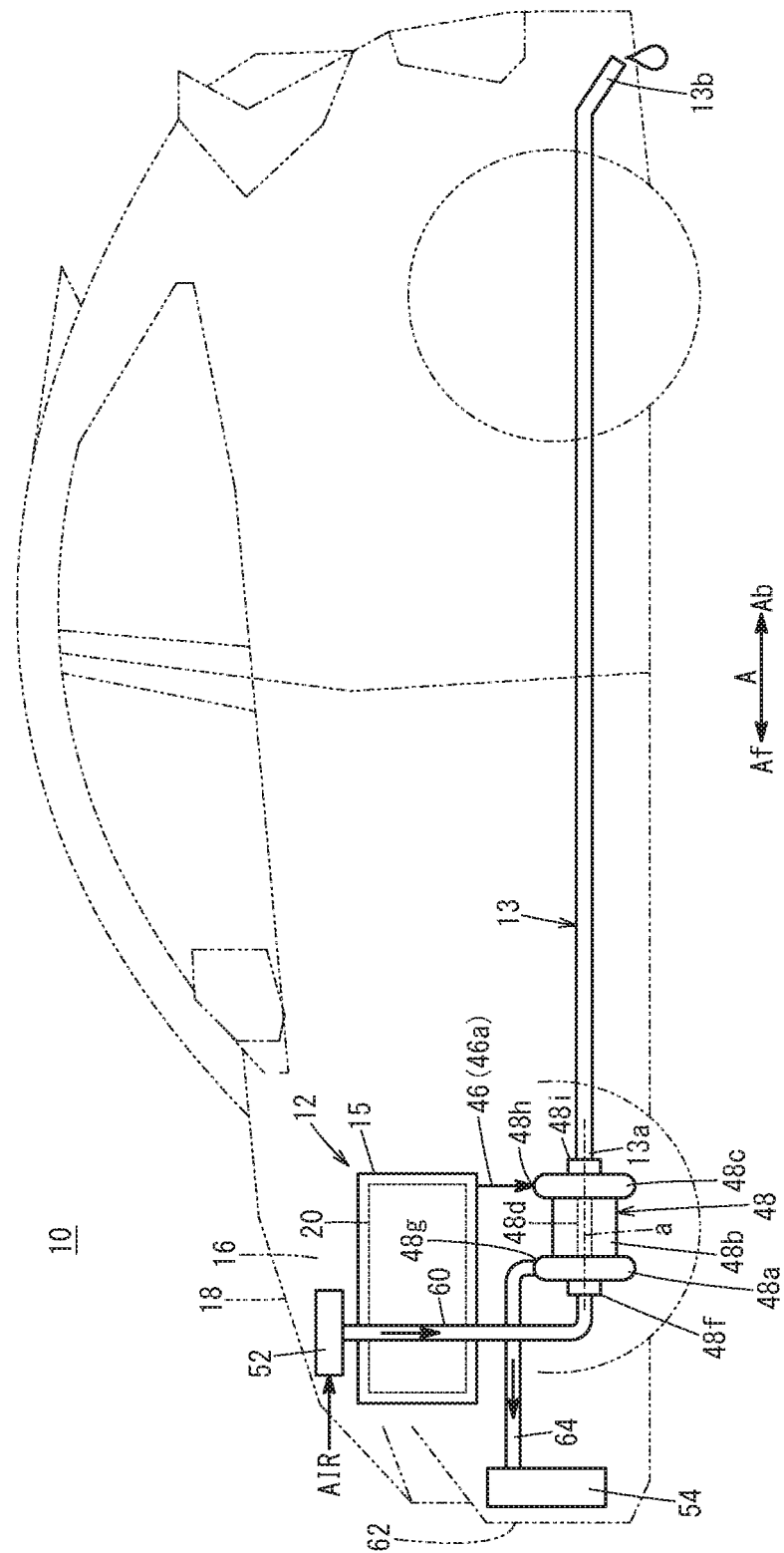
FIG. 2 is a view schematically showing a fuel cell vehicle as a whole.

As shown in FIG. 2, the fuel cell vehicle 10 includes a fuel cell system 12 including a fuel cell stack 20 for performing power generation using a fuel gas and an oxygen-containing gas, and an exhaust gas pipe 13 for discharging a cathode exhaust gas flowing out from the fuel cell system 12. The fuel cell stack 20 is provided in the motor room (below a bonnet 18) provided on the front side of the fuel cell vehicle 10. Though not shown, the fuel cell vehicle 10 includes electric equipment such as a traveling motor and an ECU (electronic control unit) operated using electrical energy generated in the fuel cell system 12.

Figure 3:
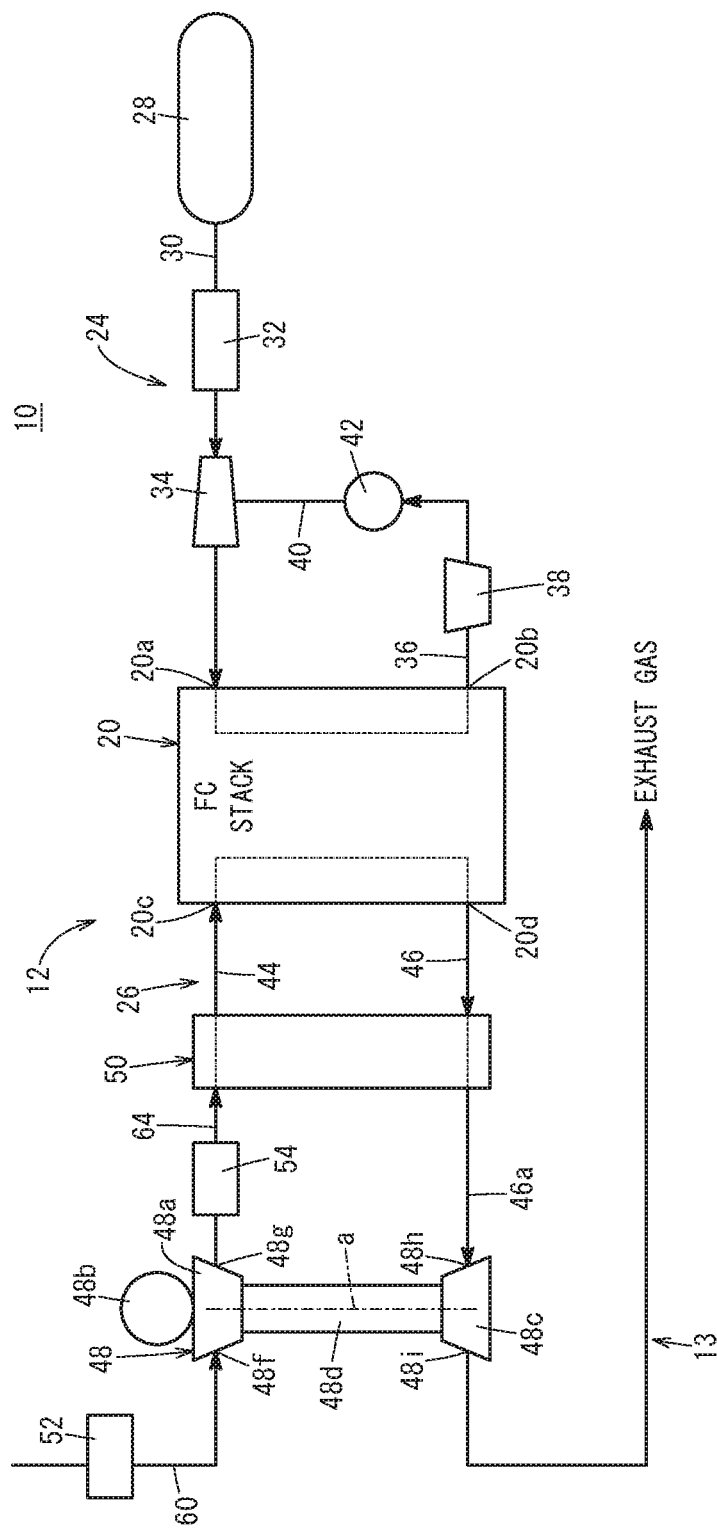
FIG. 3 is a diagram schematically showing a fuel cell system.

As shown in FIG. 3, further, the fuel cell system 12 includes a fuel gas supply apparatus 24 for supplying a fuel gas (e.g., a hydrogen gas) to the fuel cell stack 20, and an oxygen-containing gas supply apparatus 26 for supplying the air as an oxygen-containing gas to the fuel cell stack 20. Though not shown, the fuel cell system 12 includes a battery as an energy storage device, and a coolant supply apparatus for supplying a coolant to the fuel cell stack 20.

Each of the power generation cells of the fuel cell stack 20 includes a membrane electrode assembly and a pair of separators sandwiching the membrane electrode assembly from both sides. The membrane electrode assembly includes an electrolyte membrane, and an anode, a cathode provided on both surfaces of the electrolyte membrane. A fuel gas flow field is formed between an anode and one of the separators, and an oxygen-containing gas flow field is formed between the cathode and the other of the separators.

The fuel gas supply apparatus 24 includes a fuel gas tank 28 for storing a high pressure fuel gas (high pressure hydrogen), a fuel gas supply line 30 for guiding the fuel gas to the fuel cell stack 20, the injector 32 provided in a fuel gas supply line 30, and the ejector 34 provided downstream of the injector 32. The fuel gas supply line 30 is connected to a fuel gas inlet 20a of the fuel cell stack 20. The injector 32 and the ejector 34 form a fuel gas injection apparatus.

A fuel gas discharge line 36 is connected to the fuel gas outlet 20b of the fuel cell stack 20. After at least some of the fuel gas is consumed at the anodes of the fuel cell stack 20, and the fuel gas is discharged as an anode exhaust gas (fuel off gas) from the fuel cell stack 20 through the fuel gas discharge line 36. A gas liquid separator 38 is provided in the fuel gas discharge line 36. A circulation line 40 is coupled to the fuel gas discharge line 36. The anode off gas is guided through the circulation line 40 to the ejector 34. A hydrogen pump 42 (circulation pump) is provided in the circulation line 40. It should be noted that the hydrogen pump 42 may not be provided.

The oxygen-containing gas supply apparatus 26 includes an oxygen-containing gas supply line 44 connected to an oxygen-containing gas inlet 20c of the fuel cell stack 20, an oxygen-containing gas discharge line 46 connected to an oxygen-containing gas outlet 20d of the fuel cell stack 20, an air pump 48 for supplying the air to the fuel cell stack 20, and a humidifier 50 for humidifying the air supplied to the fuel cell stack 20.

The air pump 48 includes a compressor 48a for compressing the air, a motor 48b for driving the compressor 48a for rotation of the compressor 48a, and an expander (regeneration mechanism) 48c coupled to the compressor 48a. The compressor 48a is provided in the oxygen-containing gas supply line 44. An air cleaner 52 is provided in the oxygen-containing gas supply line 44, at a position upstream of the compressor 48a. The air is supplied into the compressor 48a through the air cleaner 52. An air cooling intercooler 54 for cooling the air supplied to the fuel cell stack 20 is provided in the oxygen-containing gas supply line 44, at a position downstream of the compressor 48a (specifically, downstream of the compressor 48a and upstream of the humidifier 50).

As shown in FIG. 2, the air cleaner 52 and the intercooler 54 are provided in the front part of the fuel cell vehicle 10. The air cleaner 52 is positioned below the bonnet 18, and above the air pump 48. The air cleaner 52 is provided on the vehicle front side of the air pump 48 (in the direction indicated by the arrow Af). For example, the air flows into the air cleaner 52 through an air intake port which is opened in the bonnet 18.

The air cleaner 52 and the compressor 48a are connected by a pipe 60. The pipe 60 is connected to the air inlet 48f of the compressor 48a. A filter is provided in the air cleaner 52 to remove dust particles and/or water from the intake air, and the air cleaner 52 sends the air to the air pump 48. The air cleaner 52 is provided on the vehicle front side of the exhaust gas pipe 13.

The intercooler 54 is provided on the vehicle front side of the air pump 48. For example, the intercooler 54 is provided inside a front bumper 62, and performs heat exchange between the air from the vehicle front side and the air which passed through the air compressor 48a of the air pump 48 to cool the air (oxygen-containing gas) supplied to the fuel cell stack 20. The air outlet 48g of the compressor 48a and the intercooler 54 are connected by the pipe 64. For example, the intercooler 54 is provided below the air cleaner 52, and provided on the vehicle front side of the air cleaner 52.

As shown in FIG. 3, the expander 48c is provided in the oxygen-containing gas discharge line 46. A pipe 46a of the oxygen-containing gas discharge line 46 is connected to an inlet 48h of the expander 48c. An impeller of the expander 48c is coupled to an impeller of the compressor 48a through a coupling shaft 48d. The impeller of the compressor 48a, the coupling shaft 48d, and the impeller of the expander 48c rotate together about the rotation axis a. The cathode exhaust gas flows into the impeller of the expander 48c to regenerate fluid energy from the cathode exhaust gas. The regenerative energy compensates for some of the driving force for rotating the compressor 48a.

The humidifier 50 includes a large number of water permeable hollow fiber membranes. In the water permeable hollow fiber membranes, water is exchanged between the air which flows toward the fuel cell stack 20 and the highly humidified cathode exhaust gas discharged from the fuel cell stack 20 to humidify the air supplied to the fuel cell stack 20.

As shown in FIG. 1, the air pump 48 is provided at a lower position on the front side of the fuel cell vehicle 10 (below the fuel cell stack 20). The air pump 48 is provided below the auxiliary device case 14a. That is, as viewed in the vertical direction (indicated by an arrow C), the air pump 48 is provided at a position where the air pump 48 is at least partially overlapped with the auxiliary device case 14a. It should be noted that the air pump 48 may be provided on the vehicle rear side of the fuel cell stack 20. The air pump 48 may be provided at a position where the air pump 48 is at least partially overlapped with the fuel cell stack 20 in the vertical direction.

As shown in FIG. 2, the rotation axis a of the air pump 48 is provided in parallel with the vehicle front/rear direction (indicated by the arrow A). The rotation axis a of the air pump 48 is perpendicular to the stacking direction of the fuel cell stack 20 (indicated by an arrow B in FIG. 1). In the embodiment of the present invention, the motor 48b is provided between the compressor 48a and the expander 48c. A motor rotor is provided at the coupling shaft 48d.

Figure 4:
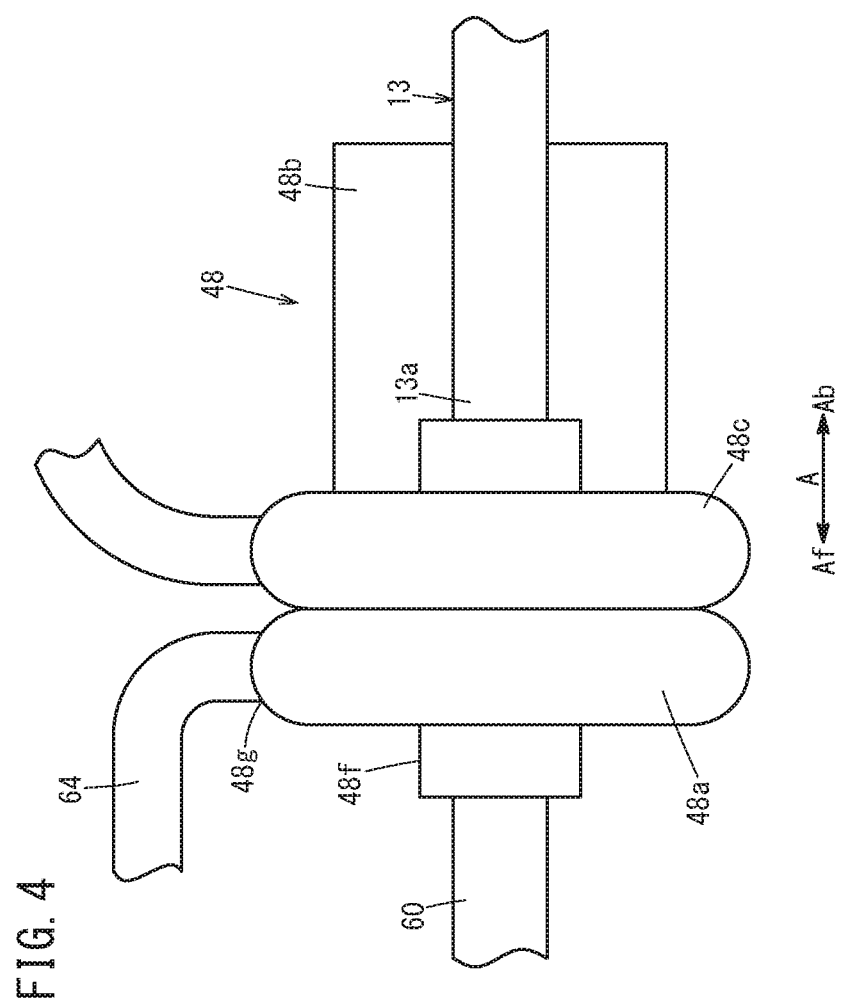
FIG. 4 is a view showing an air pump according to another structure.

As shown in FIG. 4, the compressor 48a and the expander 48c may be provided at one end of the motor 48b (on the vehicle front side). In this case, in the air pump 48, the compressor 48a is positioned on the vehicle front side of the expander 48c (in the direction indicated by the arrow Af).

As shown in FIG. 2, the compressor 48a is provided on the vehicle front side of the expander 48c. The compressor 48a is closer to the air cleaner 52 than the expander 48c is. The compressor 48a is closer to the intercooler 54 than the expander 48c is. It should be noted that the rotation axis a of the air pump 48 may be oriented in the vertical direction, and the compressor 48a may be provided above the expander 48c (adjacent to the air cleaner 52).

An exhaust gas pipe 13 is connected to an outlet 48i of the expander 48c. The front end 13a of the exhaust gas pipe 13 (connection part for connection to the expander 48c) is positioned on the vehicle rear side of, and below the air cleaner 52. The front end 13a of the exhaust gas pipe 13 is positioned on the vehicle rear side of the compressor 48a. The front end 13a of the exhaust gas pipe 13 is positioned on the vehicle rear side of the intercooler 54. The exhaust gas pipe 13 extends from the outlet 48i of the expander 48c, and extends up to the vehicle body rear part along the vehicle body bottom. Therefore, the outlet 13b of the exhaust gas pipe 13 is positioned in the vehicle body rear part.

Next, operation of the fuel cell vehicle 10 having the above structure (chiefly, operation of the fuel cell system 12) will be described.

In FIG. 3, in the fuel gas supply apparatus 24, the fuel gas is supplied from the fuel gas tank 28 to the fuel gas supply line 30. At this time, the fuel gas is injected to the ejector 34 by the injector 32. The fuel gas flows from the fuel gas inlet 20a into a fuel gas flow field in the fuel cell stack 20 through the ejector 34, and the fuel gas is supplied to the anode.

In the meanwhile, in the oxygen-containing gas supply apparatus 26, under rotation operation of the air pump 48 (compressor 48a), the air as the oxygen-containing gas is supplied to the oxygen-containing gas supply line 44. After the air is humidified by the humidifier 50, the air flows from the oxygen-containing gas inlet 20c into the oxygen-containing gas flow field in the fuel cell stack 20, and the air is supplied to the cathode. In each of the power generation cells, the fuel gas supplied to the anode and the oxygen in the air supplied to the cathode are consumed in electrochemical reactions in the electrode catalyst layers to generate electricity.

The fuel gas which has not been consumed at the anode is discharged as the anode exhaust gas from the fuel gas outlet 20b into the fuel gas discharge line 36. The anode exhaust gas is supplied into the ejector 34 from the fuel gas discharge line 36 through the circulation line 40. The anode exhaust gas supplied into the ejector 34 is mixed with the fuel gas injected by the injector 32, and supplied to the fuel cell stack 20.

The humidified cathode exhaust gas containing oxygen which has not been consumed at the cathode and the water produced in the reaction at the cathode are discharged from the oxygen-containing gas outlet 20d of the fuel cell stack 20 to the oxygen-containing gas discharge line 46. After water exchange between the cathode and the air flowing toward the fuel cell stack 20 is performed at the humidifier 50, the cathode exhaust gas is supplied into the expander 48c of the air pump 48. In the expander 48c, energy is collected from the cathode exhaust gas (regenerative energy is generated), and the regenerative energy is used partially as the driving force for driving the compressor 48a. The cathode exhaust gas and water are discharged from the expander 48c to the exhaust gas pipe 13, and discharged to the outside of the fuel cell vehicle 10 through the exhaust gas pipe 13.

In this case, the fuel cell vehicle 10 offers the following advantages.

As shown in FIG. 2, in the fuel cell vehicle 10, the distance between the compressor 48a and the air cleaner 52 is smaller than the distance between the expander 48c and the air cleaner 52. Therefore, it is possible to improve the layout efficiency of providing the pipe 60 connecting the air cleaner 52 and the compressor 48a. Further, since the expander 48c is provided at a remote position in comparison with the compressor 48a, it is possible to improve the layout efficiency of providing the exhaust gas pipe 13. Therefore, in the fuel cell vehicle 10, it is possible to improve the layout efficiency of providing pipes in the vicinity of the air pump 48.

The air cleaner 52 is provided on the vehicle front side of the exhaust gas pipe 13. The compressor 48a is provided on the vehicle front side of the expander 48c. In the structure, the pipe 60 connecting the air cleaner 52 and the compressor 48a is provided on the vehicle front side of the air pump 48, and the exhaust gas pipe 13 is provided on the vehicle rear side of the air pump 48. Therefore, it is possible to improve the layout efficiency.

The intercooler 54 for cooling the oxygen-containing gas is provided downstream of the compressor 48a in the oxygen-containing gas supply line 44. The distance between the compressor 48a and the intercooler 54 is smaller than the distance between the expander 48c and the intercooler 54. In the structure, it is possible to improve the layout efficiency of providing the pipe 64 connecting the compressor 48a and the intercooler 54.

The intercooler 54 is provided on the vehicle front side of the air pump 48, and the compressor 48a is provided on the vehicle front side of the expander 48c. In the structure, the pipe 64 connecting the intercooler 54 and the compressor 48a is provided on the vehicle front side of the air pump 48, and the exhaust gas pipe 13 is provided on the vehicle rear side of the air pump 48. Therefore, it is possible to improve the layout efficiency.

The present invention is not limited to the above described embodiment. Various modifications may be made without deviating from the gist of the present invention.

What is claimed is:

1. A fuel cell vehicle including a fuel cell system, and an exhaust gas pipe configured to discharge a cathode exhaust gas flowing out from the fuel cell system, to an outside of the fuel cell vehicle,
    wherein the fuel cell system comprises:
    a fuel cell stack;
    an oxygen-containing gas supply line connected to the fuel cell stack;
    an oxygen-containing gas discharge line connected to the fuel cell stack;
    an air pump including a compressor provided in the oxygen-containing gas supply line and an expander as a regenerative mechanism provided in the oxygen-containing gas discharge line; and
    an air cleaner provided upstream of the compressor,
    wherein the exhaust gas pipe is connected to the expander;
    the compressor is closer to the air cleaner than the expander is;
    wherein the air cleaner is provided on a vehicle front side of the exhaust gas pipe;

the compressor is provided on the vehicle front side of the expander; and an outlet of the exhaust gas pipe is positioned in a rear part of the fuel cell vehicle.

2. The fuel cell vehicle according to claim 1, wherein an intercooler configured to cool the oxygen-containing gas is provided downstream of the compressor in the oxygen-containing gas supply line; and the compressor is closer to the intercooler than the expander is.

3. The fuel cell vehicle according to claim 2, wherein the intercooler is provided on a vehicle front side of the air pump; and the compressor is provided on the vehicle front side of the expander.

4. The fuel cell vehicle according to claim 1, wherein a front end of the exhaust gas pipe is provided on the vehicle rear side of, and below the air cleaner.

5. The fuel cell vehicle according to claim 1, wherein a front end of the exhaust gas pipe is positioned on a vehicle rear side of the compressor.

6. The fuel cell vehicle according to claim 1, wherein the exhaust gas pipe is connected to an outlet of the expander; and a front end of the exhaust gas pipe is positioned on a vehicle rear side of, and below the air cleaner.

7. The fuel cell vehicle according to claim 1, wherein an intercooler configured to cool the oxygen-containing gas is provided in the oxygen-containing gas supply line, downstream of the compressor; and a front end of the exhaust gas pipe is positioned on a vehicle rear side of the intercooler.

8. The fuel cell vehicle according to claim 1, wherein a rotation axis of the air pump is provided in parallel with a vehicle front/rear direction.

\* \* \* \* \*